(12) United States Patent
Adams et al.

(10) Patent No.: US 10,341,444 B2
(45) Date of Patent: Jul. 2, 2019

(54) ABSTRACTED DEVICE SERVICE DISCOVERY

(71) Applicant: Microsoft Technology Licensing, LLC, Redmond, WA (US)

(72) Inventors: Samuel David Adams, Bellevue, WA (US); Benjamin Scott McGregor, Redmond, WA (US); Niket Ashok Sanghvi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 15/221,296

(22) Filed: Jul. 27, 2016

(65) Prior Publication Data

US 2018/0034918 A1 Feb. 1, 2018

(51) Int. Cl.
*H04L 29/08* (2006.01)

(52) U.S. Cl.
CPC .................................. *H04L 67/16* (2013.01)

(58) Field of Classification Search
None
See application file for complete search history.

(56) References Cited

U.S. PATENT DOCUMENTS

| | | | |
|---|---|---|---|
| 7,805,533 B2 | 9/2010 | Burns et al. | |
| 8,205,000 B2 * | 6/2012 | Chang | H04L 41/046 370/235 |
| 8,386,465 B2 * | 2/2013 | Ansari | G06F 17/30749 707/713 |
| 8,558,863 B2 * | 10/2013 | Naidu | H04N 7/147 348/14.01 |
| 9,124,647 B2 | 9/2015 | Williams et al. | |
| 9,158,729 B1 | 10/2015 | Joyce et al. | |
| 9,160,696 B2 * | 10/2015 | Wilsher | H04L 12/287 |
| 2005/0234873 A1 * | 10/2005 | Milligan | H04L 67/16 |
| 2006/0077917 A1 | 4/2006 | Brahmajosyula et al. | |
| 2009/0240814 A1 | 9/2009 | Brubacher et al. | |
| 2011/0047214 A1 * | 2/2011 | Lee | H04L 12/2809 709/204 |

(Continued)

FOREIGN PATENT DOCUMENTS

WO 2004040404 A2 5/2004

OTHER PUBLICATIONS

Tsaimos, et al., "Internet-of-Things Architecture IOT-A", Published on: Nov. 3, 2013 Available at: http://www.iot-a.eu/public/public-documents/d3.1.

(Continued)

*Primary Examiner* — Clayton R Williams
*Assistant Examiner* — Tania M Pena-Santana
(74) *Attorney, Agent, or Firm* — Arent Fox LLP

(57) ABSTRACT

Methods and devices for device service discovery may include receiving a query for a device service including one or more protocol-specific services connected to or discoverable by a computer device. The methods and devices may include mapping the query to one or more protocol-specific adapters selected based on the protocol-specific services. In addition, the methods and devices may include identifying at least one device endpoint representing at least one device that supports the device service and generating a list of device endpoints and corresponding service properties for each device that supports the device service.

19 Claims, 5 Drawing Sheets

(56) References Cited

U.S. PATENT DOCUMENTS

2013/0238774 A1    9/2013   Davison et al.

OTHER PUBLICATIONS

Roettgers, Janko, "LG releases open source Connect SDK, wants every TV to behave like Chromecast", Published on: Apr. 17, 2014 Available at: http://gigaom.com/2014/04/17/lg-releases-open-source-connect-sdk-wants-every-tv-to-behave-like-chromecast/.

"Enabling great Play to experiences from your Windows 8 apps (and websites!)", Published on: Nov. 16, 2012 Available at: http://blogs.msdn.com/b/windowsappdev/archive/2012/11/16/enabling-great-play-to-experiences-from-your-windows-8-apps-and-websites.aspx.

"PlayTo", Retrieved on: Jun. 7, 2016 Available at: https://play.google.com/store/apps/details?id=com.dayglows.vivid.lite.

Allen, Mary, "New IoT Reference Model creates common tongue", Published on: Nov. 17, 2014 Available at: http://www.synapse-wireless.com/communications/press-releases/new-iot-reference-model-creates-common-tongue-2/.

Sundramoorthy, et al., "Functional Principles of Registry-based Service Discovery", In Proceedings of the IEEE Conference on Local Computer Networks 30th Anniversary, Nov. 15, 2005, 8 pages.

Burgy, et al., "A High-Level, Open-Ended Architecture for SIP-based Services", In Proceedings of the tenth International Conference on Intelligence in service delivery Networks, May 2006, 2 pages.

"What Is UCMA 2.0 Core SDK", Published on: Feb. 5, 2011 Available at: https://msdn.microsoft.com/en-us/library/dd253495(v=office.13).aspx.

"IoT Client Device Framework", Retrieved on: Jun. 7, 2016 Available at: http://www.spirent.com/Products/DevTools/IoT-Client-Device-Framework.

"A Semantic Web Services Architecture", Published on: Apr. 2005 Available at: http://www.daml.org/services/swsa/note/swsa-note_v5.html.

* cited by examiner

ABSTRACTED DEVICE SERVICE DISCOVERY

BACKGROUND

The present aspects relate to a computer device, and more particularly, to discovery of services available from devices with which the computer device may communicate.

When a computer device discovers a device with which it can communicate over any one of a plurality of protocols (e.g., Bluetooth, Universal Plug and Play (UPnP), Wireless Fidelity (Wi-Fi) Direct, etc.), it is difficult for the computer device to ascertain what the device can do by simply discovering the device. For example, an application on the computer device may discover a connected device or a device with which the computer device may initiate communication, also referred to as an "endpoint," such as an endpoint that represents a television on a network, and through one or more queries may determine that the television supports streaming video. For the application to determine whether the television supports a specific type of streaming video, such as UPnP and Digital Living Network Alliance (DLNA), however, the application may need to query the television directly, e.g., using a protocol-specific language and/or procedure, to identify the services supported by the television. In this scenario, for every device service an application wants to incorporate into an application, the application needs to understand one or more protocols associated with devices that can provide the service, and implement different programming models for each protocol. For example, if an application on a computer device such as a phone wants to stream audio to a car stereo using a BLUETOOTH connection, both the car stereo and the phone need to support an Advanced Audio Distribution Profile (A2DP) profile, which defines how audio can be streamed from one device to another over a BLUETOOTH connection. In this case, the application may use a Socket Direct Protocol (SDP) Application Programming Interface (API) of an Operating System (OS) on the phone to figure out if a device has services the application knows how to use. As such, for each service an application wants to incorporate, the application must query a device and try to figure out if the device has services the application knows how to use.

Thus, there is a need in the art for improved interoperation between applications and devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a computer device. The computer device may include a memory to store data and instructions, a processor in communication with the memory, and an operating system in communication with the memory and processor. The operating system may be operable to receive a query for a device service including one or more protocol-specific services connected to or discoverable by the computer device, map the query to one or more protocol-specific adapters selected based on the protocol-specific services, identify at least one device endpoint representing at least one device that supports the device service, and generate a list of device endpoints and corresponding service properties for each device that supports the device service.

Another aspect relates to a method for service discovery on a computer device. The method may include receiving, at an operating system executing on the computer device, a query from an application executing on the computer device for a device service including one or more protocol-specific services connected to or discoverable by the computer device. The method may also include mapping, by the operating system, the query to one or more protocol-specific adapters selected based on the protocol-specific services. In addition, the method may include identifying, by the operating system, at least one device endpoint representing at least one device that supports the device service. The method may also include and generating, by the operating system, a list of device endpoints and corresponding service properties for each device that supports the device service.

Another aspect relates to computer-readable medium storing instructions executable by a computer device. The computer-readable medium may include at least one instruction for causing the computer device to receive a query for a device service including one or more protocol-specific services connected to or discoverable by the computer device. The computer-readable medium may also include at least one instruction for causing the computer device to map the query to one or more protocol-specific adapters selected based on the protocol-specific services. Additionally, the computer-readable medium may include at least one instruction for causing the computer device to identify at least one device endpoint representing at least one device that supports the device service. The computer-readable medium may also include at least one instruction for causing the computer device to generate a list of device endpoints and corresponding service properties for each device that supports the device service.

Additional advantages and novel features relating to aspects of the present invention will be set forth in part in the description that follows, and in part will become more apparent to those skilled in the art upon examination of the following or upon learning by practice thereof.

DETAILED DESCRIPTION

Figure 1:
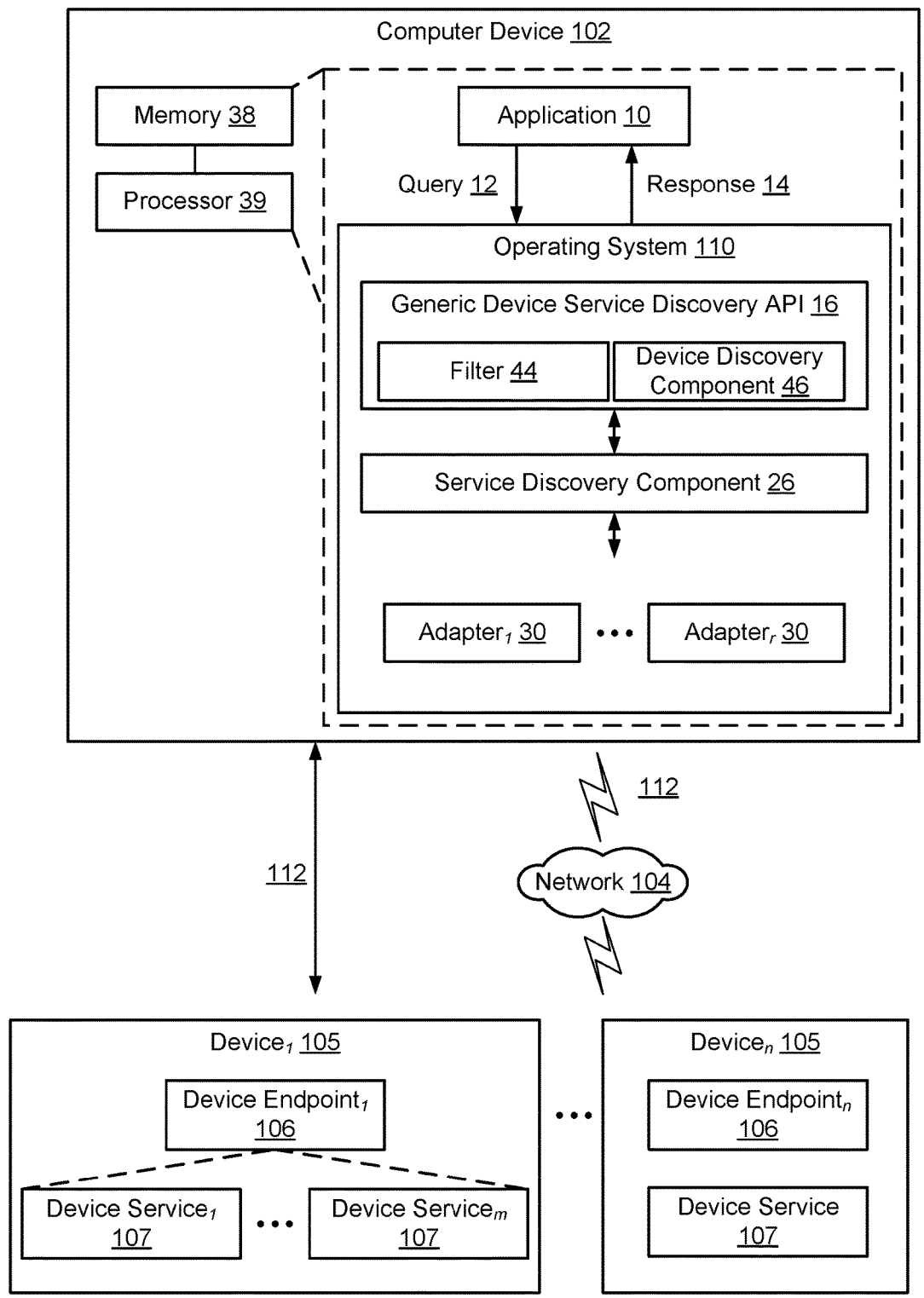
FIG. 1 illustrates an example device in accordance with an aspect.

The described aspects allow the discovery of services and/or functionality supported by device endpoints in communication with a computer device using one or more abstracted, e.g., operating system-wide, service discovery application programming interfaces (APIs). The described aspects find services, and corresponding protocol-specific service properties, of device endpoints that may be currently connected to the computer device, or that may be detectable by the computer device, e.g., over one or more direct or wireless connections, using one or more communication or networking protocols. Previously, to discover services of device endpoints, the device endpoints needed to first be associated with the computer device and each device endpoint queried using protocol-specific language for the available services. As such, prior to the present aspects, applications on a computer device were not able to use unpaired devices or interact with a device service transiently.

In other words, the described aspects provide one or more common service APIs that an application may query to identify services and/or specific functionalities provided by device endpoints. In some cases, the common service API may apply filters to the query so that targeted searching for the services and functionality provided by device endpoints may occur. The common service API may be unified across all protocols so that an application may have a general and flexible way to discover device services. The described aspects also allow the discovery of services and use of services supported by device endpoints regardless of whether the device endpoints are paired to the device. Thus, an application executing on a computer device may discover both paired and unpaired devices that implement the functional contract an application is looking for.

Device protocols may vary among device endpoints. The described aspects provide system-wide object models (e.g., across an operating system of a computer device) to define the various functionalities or services provided by a device. The described aspects normalize the different implementations of device services in the various protocols into a single coherent system-wide view agnostic of the protocols from which they are derived. That is, the system-wide object models may standardize the services across the system. As such, applications executing on the computer device may use the system-wide object models to discover and use the services and functionalities provided by device endpoints. The system-wide object models may define how to use the device endpoints so that an application may use the services provided by the device endpoints without knowing how the underlying protocols work. As such, instead of querying each device and reviewing the device properties to determine whether the device can support a specific functionality or service, the described aspects allow a query to be sent requesting information about devices connected to or discoverable by the device. A response message may be received with a list of device endpoints that support the requested service. As such, an application may discover all relevant devices services generally with a single query. Additionally, in some aspects, the response message may include corresponding protocol-specific properties associated with each service. Further, the present aspects enable an application to discover device services and use the services without knowing how the underlying protocols work. The application may also discover device services without communicating directly with each of the device endpoints. Thus, for example but not limited hereto, an application can utilize a service API according to the present aspects to discover an endpoint that represents a television on a network, and to further discover that the television supports streaming video, and specifically, Universal Plug'n'Play (UPnP) plus Digital Living Network Alliance (DLNA) type streaming.

Therefore, by abstracting the object models into a general system-wide view, the present aspects enable a general and flexible way to discover device services to be achieved. Further, in some cases, the present aspects may allow application programming to be greatly simplified. Thus, based on the present disclosure, applications may be able to use common code to discover services across multiple protocols and greatly reduce the code needed by an application when querying multiple protocols. As such, an application may directly query services across many protocols.

Referring now to FIG. 1, an example computer device 102 in accordance with an aspect may include one or more applications 10 executed or processed by processor 39 and/or memory 38 of computer device 102. Memory 38 may be configured for storing data and/or computer-executable instructions defining and/or associated with applications 10, and processor 39 may execute applications 10. An example of memory 38 can include, but is not limited to, a type of memory usable by a computer, such as random access memory (RAM), read only memory (ROM), tapes, magnetic discs, optical discs, volatile memory, non-volatile memory, and any combination thereof. An example of processor 39 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computing device, which may be connectable to a network 104. Computer device 102 may be, for example, a computing device such as a desktop or laptop or tablet computer, a cellular telephone, a gaming device, a music device, a television, a navigation system, a camera, a personal digital assistant (PDA), or a handheld device, or any other computing device having wired and/or wireless connection capability with one or more other devices.

Application 10 may communicate with at least one generic device service application programming interface (API) 16 to discover one or more services and/or functionalities provided by one or more (e.g., up to any number, n) device endpoints 106. Each device endpoint 106 includes a unique identifier representing one or more corresponding devices 105 (e.g., audio device, video device, printing device, storage device, television, camera, etc.) in communication with or discoverable by computer device 102. Device endpoints 106 may be currently directly or indirectly connected to or discoverable by computer device 102, such as via one or more connections 112, e.g., a serial connector, universal serial bus (USB), wired link, wireless link, or a link via network 104, etc., using one or more protocols specific to each device endpoint 106. Examples of such protocols may include, but are not limited to, physically connected bus protocols (e.g., Peripheral Component Interconnect (PCI) and Universal Serial Bus (USB)), UPnP, DLNA, Domain Name System (DNS) Service Discovery (DNS-SD), Web Services on Devices (WSD), Bluetooth, Wi-Fi Direct, Wireless Gigabit Alliance (WiGig), and Point of Service. Network 104 may provide one or more types of communication connections, such as any type of wireless airlink, to computer device 102 and device endpoints 106. Application 10 may use the generic device service discovery API 16 to find a device to connect with for performing a particular type of service, and to receive information about device services and/or features and/or protocol-specific properties provided by device endpoints 106 connected to or discoverable by computer device 102. In addition, application 10 may use the generic device service discovery API 16 to receive notifications when device endpoints 106 connect, disconnect, change online status, or change other service properties.

Generic device service discovery API 16 may abstract the various service contracts provided by device endpoints 106 so that application 10 may discover various services and/or functionality and/or protocol-specific properties provided by device endpoints 106 without having to communicate directly with device endpoints 106. Moreover, application 10 may use generic device service discovery API 16 to discover various services and/or functionality provided by device endpoints 106 without needing to know how the underlying protocols work.

For example, in an aspect, application 10 may send a query 12 to generic device service discovery API 16 to identify various device services that may be available to application 10. In an aspect, query 12 may be used for a generic discovery of device endpoints 106 and a corresponding one or more (e.g., up to any number, m) device services 107 provided by each device endpoint 106. Query 12 may specify various functionalities and/or services that application 10 may need to use, and may do so in a generic manner. Application 10 may receive a response message 14 with a list of device endpoints 106, and, optionally, one or more device services 107, which may include protocol-specific properties corresponding to each device service 107, that provide the specified functionalities and/or services requested by query 12. For example, a voice chat application may send a query for voice services and may receive a list of microphones or webcams for the application to select to use. In another example, a photo import application may send a query for importing photos and may receive a list of removable storage devices from which the application may import photos. Device endpoints 106 may be included in the result list regardless of whether the device endpoints 106 are paired with computer device 102. Accordingly, based on response message 14, application 10 may automatically, or via user input, select one or more device endpoints 106 and/or one or more services provided by device endpoints 106, for use with application 10.

Further, in a more specific example, a user of application 10 may want to identify all device endpoints 106 that are capable of streaming video. Application 10 may send a query 12 to generic device service discovery API 16 requesting a result list of all device endpoints 106 in communication with computer device 102 that support streaming video. Application 10 may receive a response message 14 with a list of device endpoints 106 that support streaming video, wherein the list may further include protocol-specific properties (e.g., use of UPnP+DLNA protocol, etc.) of each device endpoint 106. As such, application 10 may receive service information about various device endpoints 106 without communicating directly with the device endpoints 106 and without needing to know the underlying protocols to communicate with the device endpoints 106.

In another aspect, query 12 may be used to establish a device services monitor to notify application 10 of any changes in a specified service. For example, application 10 may be notified upon changes in a property of device endpoint 106, an addition of a device endpoint 106 that provides the specified service, a deletion of a device endpoint 106 that provides the specified service, a deletion of the specified service from the device endpoint 106, a new property associated with the specified service, or when a device endpoint 106 no longer matches the criteria provided to establish the device services monitor. The monitoring may occur in the foreground or background processing of the application.

Query 12 may also specifically identify a device endpoint 106. For example, application 10 may know the address of a device endpoint 106 and may specify the device address in query 12. For example, query 12 may request all services provided by the identified device endpoint 106. Query 12 may also request a specific service. For example, application 10 may want results that only apply to Wi-Fi direct.

Generic device service discovery API 16 may communicate with service discovery component 26 to identify services that match the search criteria provided from query 12. In an aspect, query 12 may include a protocol specific service definition for each protocol application 10 may want to use. For example, protocol specific service definitions may include, but is not limited to, protocols for physically connected buses (e.g., Peripheral Component Interconnect (PCI) and Universal Serial Bus (USB)), UPnP, DLNA, Domain Name System (DNS) Service Discovery (DNS-SD), Web Services on Devices (WSD), BLUETOOTH, Wi-Fi Direct, Wireless Gigabit Alliance (WiGig), and Point of Service. Generic device service discovery API 16 may identify one or more protocols to search for based on the protocol specific service definition received in query 12. In addition, generic device service discovery API 16 may filter the result list received from service discovery component 26 before providing response 14 to application 10. For example, query 12 may want to discover device endpoints 106 having device services 107 that support Advanced Audio Distribution Profile (A2DP) or DLNA audio streaming. As such, service discovery component 26 may search for all device endpoints 106 that support A2DP or DLNA audio streaming. Service discovery component 26 may return a result list of devices 105, such as a car stereo, having the requested device service 107, and the result list may further including protocol-specific properties, such as information defining a BLUETOOTH protocol that supports A2DP supported by the car stereo discovered during the search.

Service discovery component 26 may include a discovery filter 44 to process the received information from query 12 so that a targeted search of the system-wide services and device endpoints 106 may be performed. In an aspect, filter 44 may define a scope for query 12. In an aspect, the query and filter may be combined into a single parameter in the API call (without differentiation of a query vs. a filter) and the underlying API call may separate the parameters passed in the API call. For example, an application may query a BLUETOOTH adapter and specify a filter to "only provide services of type A and type B", or "only provide services of type A which have a name starting with foo." The BLUETOOTH adapter may apply the received filter to the protocol query to improve performance. In another example, a user of application 10 may want to identify all device endpoints 106 that are thermostats over different protocols. As such, query 12 may include a requests for thermostats over WiFi, BLUETOOTH, and DNS-SD. Discovery component 26 may search for all device endpoints 106 that are thermostats. In addition, discovery component 26 may apply a filter so that result list only includes thermostats that support WiFi, BLUETOOTH, and DNS-SD. As such, filter 44 may receive criteria to narrow a scope of a search.

Service discovery component 26 may also include or be in communication with a device discovery component 46 to identify the various device endpoints 106 (FIG. 1) in communication with computer device 102. Device discovery component 46 may search for all device endpoints 106 that are connected to or detectable by computer device 102. For example, an audio playback application may want to discover device endpoints 106 that are capable of playing audio. Device discovery component 46 may identify speakers plugged into computer device 102, BLUETOOTH speakers in communication with computer device 102, and UPnP networked speakers. Service discovery component 26 may then further identify one or more device services 107 associated with each identified device 105.

Service discovery component 26 may communicate with one or more protocol-specific adapter components 30 to map a specific device service 107 on device endpoint 106 to a system-wide object model.

Figure 2:
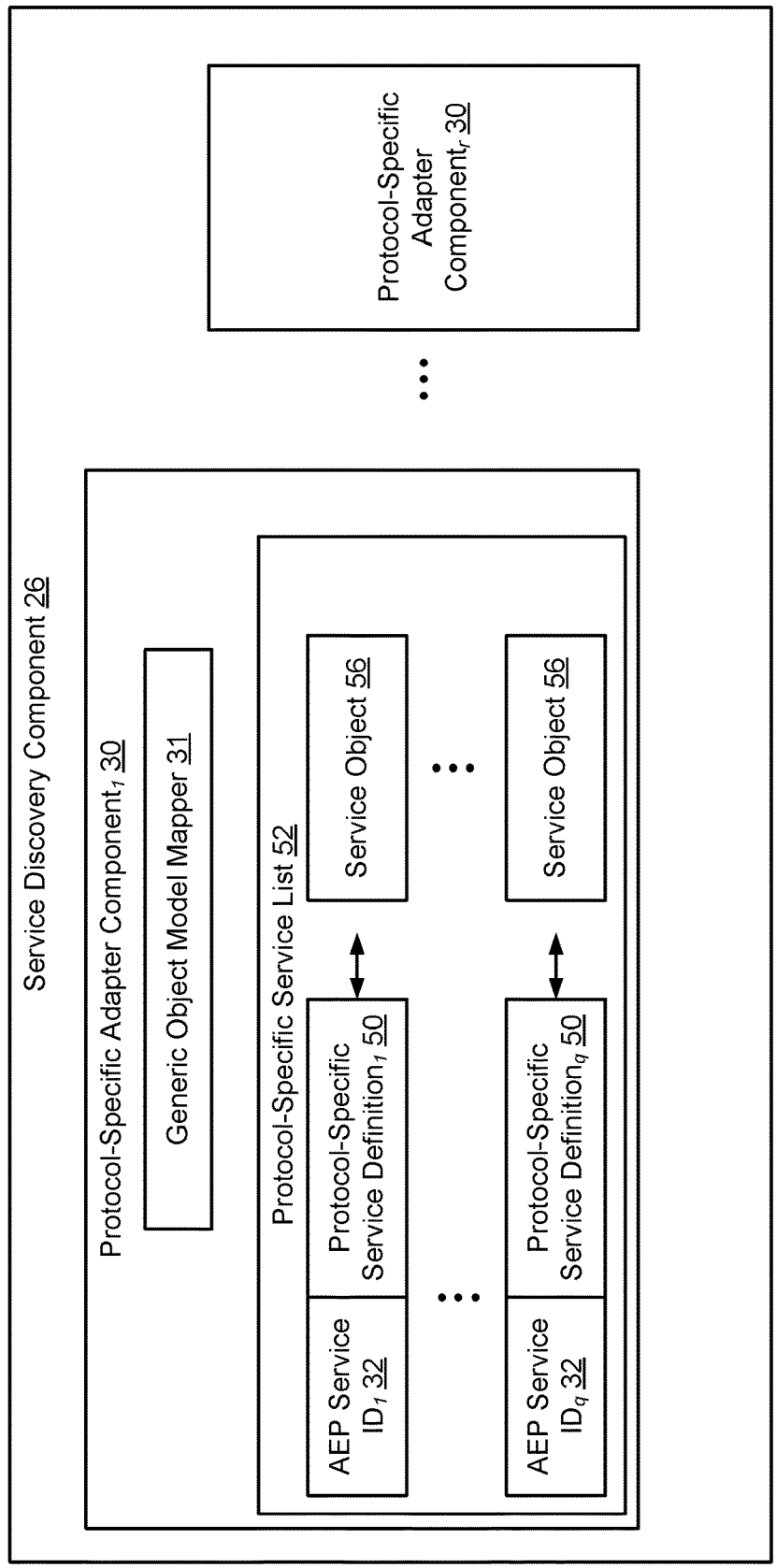
FIG. 2 illustrates an example service association component in accordance with an aspect.

More specifically, referring now to FIG. 2, protocol-specific adapter component 30 may include a generic object model mapper 31 to map a specific device service 107 on device endpoint 106 to a system-wide object model. Generic object model mapper 31 may map the one or more protocol-specific service definitions 50 associated with each device service 107 on device endpoint 106 to a system-wide service object 56. In an aspect, for instance, service discovery component 26 may communicate with a plurality of protocol-specific adapter components 30 that each include a respective protocol-specific service list 52 for a respective protocol. Each protocol-specific service list 52 may include a list of one or more protocol-specific service definitions 50 along with a corresponding one or more associated device endpoint (AEP) service identifiers (IDs) 32, which may be a set of one or more numbers, letters, characters, etc., used to uniquely identify a specific device endpoint 106. As such, this relationship allows the protocol-specific service definitions 50 to be mapped back to a specific device endpoint 106. In addition, protocol-specific service list 52 may associate the one or more protocol-specific service definitions 50 with a corresponding one or more system-wide service objects 56. As such, the protocol-specific service definitions 50 may be abstracted into system-wide object model that may be used to query services across any protocol.

Protocol-specific adapter component 30 may generate one or more service objects 56. Service objects 56 may be a functional contract that includes protocol-specific usage for the protocol-specific service definitions 50. Service objects 56 may be used to identify any device service 107 on device endpoint 106. In addition, service objects 56 may explain how to use the device services 107 on device endpoint 106. Service objects 56 may be a generic system-wide object so that regardless of the protocol, the same format for the object model may be used by the system so that the same code may be used to query services across any protocol. As such, applications may use common code to discover services across multiple protocols and greatly reduce the code needed by an application when querying multiple protocols.

Figure 3:
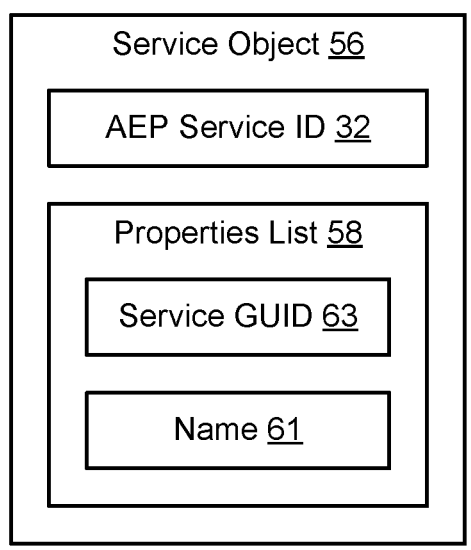
FIG. 3 illustrates an example service object in accordance with an aspect.

Referring additionally to FIG. 3, service object 56 may include AEP Service ID 32 that uniquely identifies device endpoint 106. As noted previously, device endpoint 106 may have 0-m device services 107, where each device service 107 may be represented by a different service object 56. In addition, service object 56 may include a property list 58. Property list 58 may include various information that may be used to determine services, properties, and other information about device endpoint 106. In some aspects, property list 58 may be used to filter and/or limit the search results to devices 105 with the specified traits or functionality. In addition, property list 58 may be used to indicate device information to be returned to application 10 (FIG. 1) so that application 10 knows what device services 107 are available and how to use the device services 107. For example, property list 58 may include a service Globally Unique Identifier (GUID) 63 associated with a device service 107. Service GUID 63 may be a unique set of one or more numbers, letters, characters, etc., used to identify a specific service type or resource of device 105 (as represented by device endpoint 106) that is available to computer device 102, including custom services that may be supplied by device 107/device endpoint 106. In addition, property list 58 may include a display name 61 to aid in querying properties. Display name 61 may be a set of one or more letters, numbers, characters, etc., that define a user friendly name to identify a device service 107. Further, property list 58 may also include, for example, an identity of the protocol used to discover device 107/device endpoint 106 and whether device 107/device endpoint 106 is paired with computer device 102. As such, service object 56 may be used to identify what device services 107 are available on device endpoint 106 and how to use the services.

In one use case, which should not be construed as limiting, an example service object 56 for a WiFiDirect device endpoint 106 may include the following: Display Name 61: "WiFiDirect"; Provider Specific AEP ID: "00-aa-00-62-c6-09"; and Service GUID 63: "36d0e06e-e9e3-42a4-976b-316b3ca584ee"; and AEP Service ID 32: "WiFi-Direct#00-aa-00-62-c6-09#{36d0e06e-e9e3-42a4-976b-316b3 ca584ee}." Thus, service object 56 may uniquely map back to a specific device service 107 on a specific device 105 identified by a specific AEP Service ID 32 of the device endpoint 106, and application 10 may use the information in service object 56 to know how to use the services.

As such, in these aspects, service discovery component 26 may find matches to query 12 (FIG. 1) based on mapping one or more terms of query 12 to the AEP service ID and then to the corresponding service object 56.

Referring back to FIG. 2, service discovery component 26 may use the service objects 56 received from device endpoints 106 to update the protocol-specific service list 52. The protocol-specific service list 52 may dynamically update as different service objects 56 are received, removed, and/or modified.

Referring back to FIG. 1, service discovery component 26 may transmit the service objects 56 to generic device service discovery API 16 so that an application 10 may know what device services 107 are available on device endpoint 106, and may further have instructions on how to use the one or more device services 107 on device endpoint 106.

Figure 4:
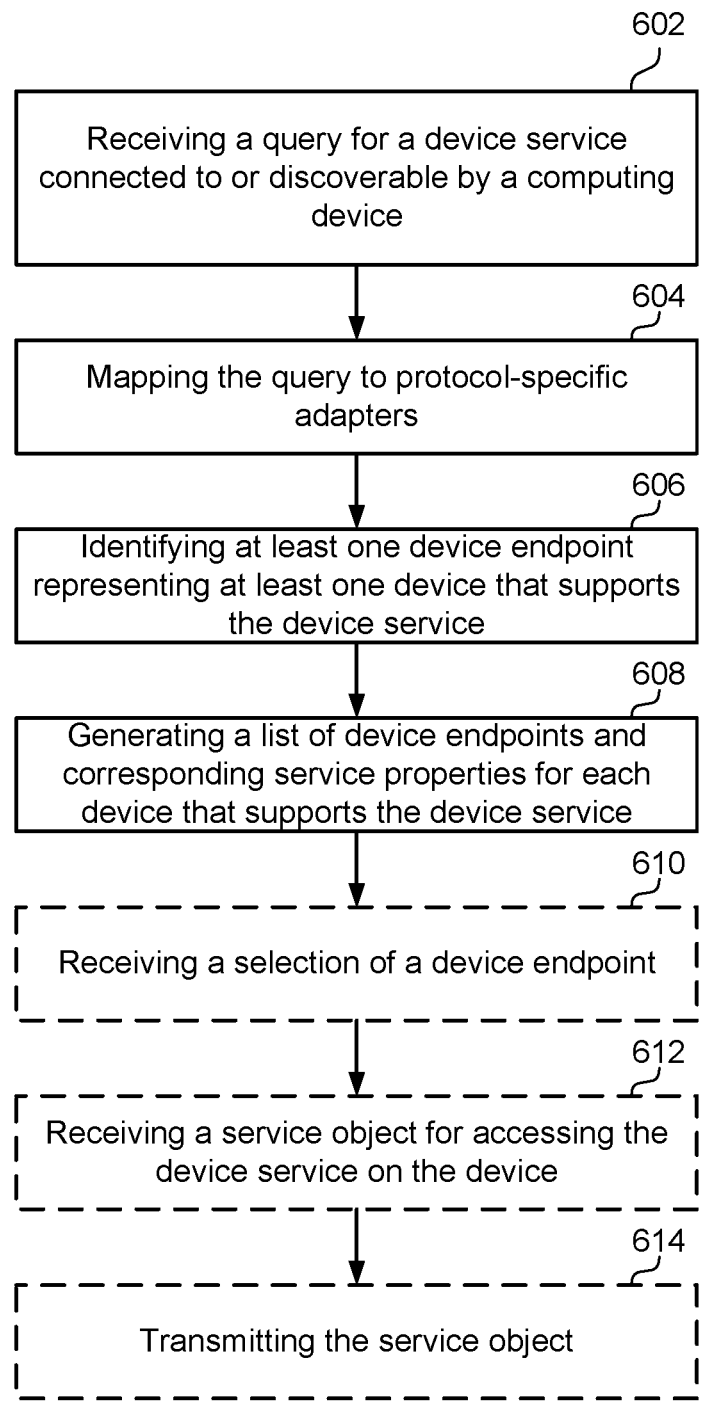
FIG. 4 is a flow chart illustrating a method for service discovery in accordance with an aspect.

Referring now to FIG. 4, illustrated therein is an example method 600 for service discovery in accordance with an aspect. Method 600 may be executed by operating system 110 on computer device 102, for example, in response to application 10 inquiring about available device services 107 of devices 105 connected with or discoverable by computer device 12. At 602, method 600 may include receiving a query for a device service connected to or discoverable by a computing device. For example, operating system 110 (FIG. 1) executing on computer device 102 (FIG. 1) may receive a query 12 from application 10 executing on computer device 102 for a device service 107 connected to or discoverable by computer device 102. The query 12 may be for a generic discovery of device endpoints 106 (FIG. 1). The query 12 may also specify various functionalities and/or services application 10 may need to use. In an aspect, query 12 may include protocol-specific services. In addition, the query 12 may be for monitoring changes associated with connected or discoverable devices having the device service. Changes associated with connected or discoverable devices may include, but are not limited to, an addition of a device endpoint having the device service, a deletion of a device endpoint having the device service, and a modification in a device endpoint having the device service.

At 604, method 600 may include mapping the query to protocol-specific adapters. Service discovery component 26 may communicate with one or more protocol-specific adapter components 30 based on query 12. In an aspect, service discovery component 26 may select adapter components 30 based on, for example, protocol-specific services included in query 12. Service discovery component 26 may map the requested protocol-specific services to all of the available protocol-specific adapter components 30. Service discovery component 26 may apply a filter to the query 12 to define a scope for query 12. For example, the query and filter may be combined into a single parameter in the API call (without differentiation of a query vs. a filter). The underlying API call may separate the query and filter and reason through the parameter passed in the API call. In another aspect, the query and filter may be separate parameters in the API call and the API may be implemented such that result lists takes multiple separate steps (e.g., first send the query, get a response and send the filter, get a filtered response from the API). Service discovery component 26 may use the filter to identify protocol specific adapter components 30 to communicate with. For example, query 12 may include a requests for thermostats over WiFi, BLUETOOTH, and DNS-SD. Service discovery component 26 may apply a filter to limit the mapping to adapter components 30 that are available and support WiFi, BLUETOOTH, and DNS-SD.

At 606, method 600 may also include identifying at least one device endpoint representing at least one device that supports the device service. For example, service discovery component 26 and generic device service discovery API 16 may identify at least one device endpoint 106 representing at least one device 105 that supports the device service 107. Service discovery component 26 may communicate with one or more protocol-specific adapter components 30 to identify the device endpoints 106 that correspond to the system-wide service objects 56. Service discovery component 26 may receive one or more system-wide service objects 56 from protocol-specific adapter components 30 that provide protocol-specific usage for the requested protocol-specific services. Service discovery component 26 may compile a list of device endpoints 106 when the system-wide service objects 56 match the device services 107. For example, application 10, such as an audio playback application, may want to discover device endpoints 106 that are capable of playing audio. Device discovery component 46 may identify one or more corresponding devices 105 having such device service 107, such as speakers plugged into computer device 102, BLUETOOTH speakers in communication with computer device 102, and UPnP networked speakers.

At 608, method 600 may also include generating a list of device endpoints and corresponding service properties for each device that supports the device service. For example, service discovery component 26 and generic device service discovery API 16 may generate a list of device endpoints 106 and corresponding service properties (e.g., property list 58) for each device 105 that supports the respective device service 107. The list of device endpoints 106 may be transmitted to an application 10 (FIG. 1) for further processing. For example, application 10 may send a query 12 to discover device endpoints 106 having device services 107 that support Advanced Audio Distribution Profile (A2DP) or DLNA audio streaming. Service discovery component 26 may search for all device endpoints 106 that support A2DP or DLNA audio streaming. Service discovery component 26 may return a result list of device endpoints 106 and corresponding devices services 107 and properties, such as a car stereo operating on Bluetooth protocol and supporting A2DP audio streaming, discovered during the search.

In an aspect, the list of device endpoints 106 and corresponding service properties for each device 105 that supports the device service 107 may dynamically update when changes occur to device services 107 provided by device endpoints 106 in communication with computer device 102. For example, when device endpoints 106 are added, connect to computer device 102, disconnect, change online status, or change other properties, the list of device endpoints 106 and corresponding service properties for each device service 107 update to illustrate the changes in services.

Further, in some aspects, the list of device endpoints 106 and corresponding service properties for each device 105 that supports the device service 107 may be outputted on a graphic user interface of computer device 102, and including a prompt to a user to enter a selection.

Optionally, at 610, method 600 may include receiving a selection of a device endpoint. In an aspect, service discovery component 26 may receive a selection of a device endpoint 106. Application 10 may select one or more device endpoints 106 for use with application 10. In addition, application 10 may select one or more device services 107 provided by device endpoints 106 for use with application 10. Further, in some aspects, application 10 may select one or more device endpoints 106 and/or one or more corresponding device services 107 in response to a user input received from a user of computer device 102, such as in response to the prompt associated with the above-noted graphical user interface.

At 612, method 600 may also include receiving a service object for accessing the device service on the device. For example, service discovery component 26 may receive service object 56 from protocol-specific adapter component 30 for accessing one or more device services 107 on device endpoint 106. Service objects 56 may be a used to identify protocol specific service properties of a respective device service 107 of the at least one device endpoint 106. In addition, service objects 56 may define how to use the one or more device services 107 on device endpoint 106.

At 614, method 600 may include transmitting the service object. In an aspect, in response to query 12, service discovery component 26 may transmit service object 56 to generic device service discovery API 16 (FIG. 1) so that application 10 may receive identification of device endpoint 106 and instructions on how to use the one or more device services 107 available on device endpoint 106.

Figure 5:
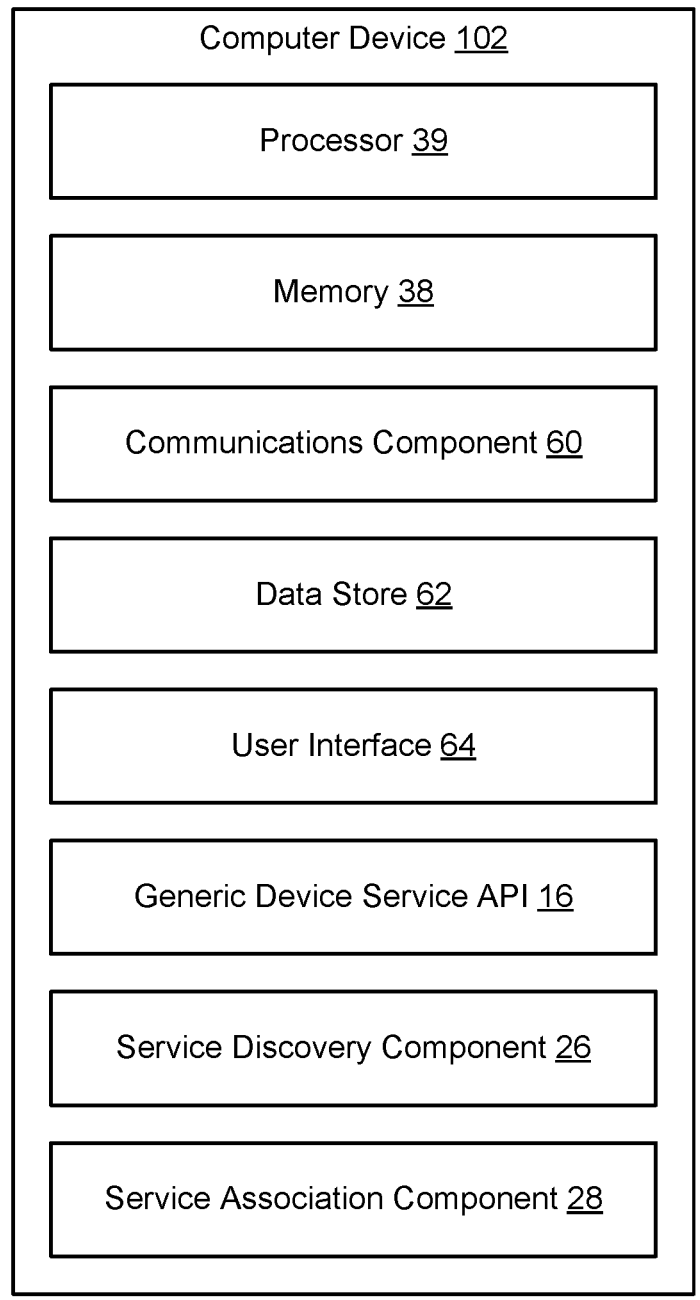
FIG. 5 is an example device in accordance with an aspect.

Referring now to FIG. 5, illustrated is an example computer device 102 in accordance with an aspect, including additional component details as compared to FIG. 1. In one aspect, computer device 102 may include processor 39 for carrying out processing functions associated with one or more of components and functions described herein. Processor 39 can include a single or multiple set of processors or multi-core processors. Moreover, processor 39 can be implemented as an integrated processing system and/or a distributed processing system.

Computer device 102 may further include memory 38, such as for storing local versions of applications being executed by processor 39. Memory 38 can include a type of memory usable by a computer, such as random access memory (RAM), read only memory (ROM), tapes, magnetic discs, optical discs, volatile memory, non-volatile memory, and any combination thereof. Additionally, processor 39 and memory 38 may include and execute operating system 110 (FIG. 1).

Further, computer device 102 may include a communications component 60 that provides for establishing and maintaining communications with one or more parties utilizing hardware, software, and services as described herein. Communications component 60 may carry communications between components on computer device 102, as well as between computer device 102 and external devices, such as devices located across a communications network and/or devices serially or locally connected to computer device 102. For example, communications component 60 may include one or more buses, and may further include transmit chain components and receive chain components associated with a transmitter and receiver, respectively, operable for interfacing with external devices.

Additionally, computer device 102 may include a data store 62, which can be any suitable combination of hardware and/or software, that provides for mass storage of information, databases, and programs employed in connection with aspects described herein. For example, data store 62 may be a data repository for applications 10 (FIG. 1) not currently being executed by processor 39. In addition, data store 62 may be a data repository for service objects 56 (FIG. 3), protocol-specific service definitions 50 (FIG. 2), AEP service IDs 32 (FIG. 2), and protocol-specific service list 52 (FIG. 2).

Computer device 102 may also include a user interface component 64 operable to receive inputs from a user of computer device 102 and further operable to generate outputs for presentation to the user. User interface component 64 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 64 may include one or more output devices, including but not limited to a display, a speaker, a haptic feedback mechanism, a printer, any other mechanism capable of presenting an output to a user, or any combination thereof.

Computer device 102 may additionally include generic device service discovery API 16 (FIG. 1) operable for receiving service discovery queries from application 10 (FIG. 1). In addition, computer device 102 may include service discovery component 26 (FIG. 1) operable to search system-wide object models of device endpoint services in response to the received discovery queries. Computer device 102 may also include protocol-specific adapter components 30 (FIG. 1) operable to associate the system-wide object models with specific services of device endpoints 106 (FIG. 1). In an aspect, user interface component 64 may transmit and/or receive messages corresponding to the operation of generic device service discovery API 16, service discovery component 26, and/or protocol-specific adapter components 30. In addition, processor 39 executes generic device service discovery API 16, service discovery component 26, and protocol-specific adapter components 30, and memory 38 or data store 62 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., computer device 102 and/or device 105), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A computer device, comprising:
   a memory to store data and instructions;
   a processor in communication with the memory; and
   an operating system in communication with the memory and processor, wherein the operating system is operable to:
   receive a query for a device service including one or more protocol-specific services provided by one or more device endpoints connected to or discoverable by the computer device;
   map the query to one or more protocol-specific adapters selected based on the protocol-specific services, wherein the one or more protocol-specific adapters each include, for a respective protocol, protocol specific service definitions abstracted into corresponding system wide object models;
   receive one or more system wide service objects that provide protocol specific usage for the requested device service;
   identify at least one device endpoint associated with the one or more system wide service objects representing at least one device that supports the device service; and
   generate a list of device endpoints and corresponding service properties for each device that supports the device service.

2. The computer device of claim 1, wherein the operating system is further operable to identify at least one device endpoint that supports the device service by receiving an identification of a device endpoint that corresponds to the one or more system-wide service objects.

3. The computer device of claim 2, wherein the one or more system-wide service objects define how to use to the device services on the at least one device endpoint.

4. The computer device of claim 2, wherein the one or more system-wide service objects identify protocol-specific service properties of the at least one device endpoint for the device service.

5. The computer device of claim 1, wherein the operating system is further operable to apply a filter to define a scope of the query.

6. The computer device of claim 1, wherein the operating system is further operable to apply a filter to identify the one or more protocol specific adapter components.

7. The computer device of claim 1, wherein the operating system is further operable to:
   monitor changes associated with connected or discoverable devices having the devices service; and
   update the list of device endpoints that support the device service based on the monitoring.

8. The computer device of claim 7, wherein the changes associated with connected or discoverable devices include one or more of an addition of a device endpoint having the device service, a deletion of a device endpoint having the device service, and a modification in a device endpoint having the device service.

9. The computer device of claim 1, wherein the one or more system wide service objects configured for querying device services across any protocol.

10. A method for service discovery on a computer device, comprising:
    receiving, at an operating system executing on the computer device, a query from an application executing on the computer device for a device service including one or more protocol-specific services provided by one or more device endpoints connected to or discoverable by the computer device;
    mapping, by the operating system, the query to one or more protocol-specific adapters selected based on the protocol-specific services, wherein the one or more protocol-specific adapters each include, for a respective protocol, protocol specific service definitions abstracted into corresponding system wide object models;
    receiving one or more system wide service objects that provide protocol specific usage for the requested device service;
    identifying, by the operating system, at least one device endpoint associated with the one or more system wide service objects representing at least one device that supports the device service; and
    generating, by the operating system, a list of device endpoints and corresponding service properties for each device that supports the device service.

11. The method of claim 10, wherein identifying the at least one device endpoint further comprises receiving an identification of a device endpoint that corresponds to the one or more system-wide service objects.

12. The method of claim 11, wherein the one or more system-wide service objects define how to use to the device services on the at least one device endpoint.

13. The method of claim 11, wherein the one or more system-wide service objects identify protocol-specific service properties of the at least one device endpoint for the device service.

14. The method of claim 10, further comprising applying a filter to define a scope of the query.

15. The method of claim 10, further comprising applying a filter to identify the one or more protocol specific adapter components.

16. The method of claim 10, further comprising:
monitoring changes associated with connected or discoverable devices having the devices service; and
updating the list of device endpoints that support the device service based on the monitoring.

17. The method of claim 16, wherein the changes associated with connected or discoverable devices include one or more of an addition of a device endpoint having the device service, a deletion of a device endpoint having the device service, and a modification in a device endpoint having the device service.

18. The method of claim 10, wherein the one or more system wide service objects are configured for querying device services across any protocol.

19. A non-transitory computer-readable medium storing instructions executable by a computer device, comprising:
at least one instruction for causing the computer device to receive a query for a device service including one or more protocol-specific services provided by one or more device endpoints connected to or discoverable by the computer device;
at least one instruction for causing the computer device to map the query to one or more protocol-specific adapters selected based on the protocol-specific services, wherein the one or more protocol-specific adapters each include, for a respective protocol, protocol specific service definitions abstracted into corresponding system wide object models;
at least one instruction for causing the computer device to receive one or more system wide service objects that provide protocol specific usage for the requested device service;
at least one instruction for causing the computer device to identify at least one device endpoint associated with the one or more system wide service objects representing at least one device that supports the device service; and
at least one instruction for causing the computer device to generate a list of device endpoints and corresponding service properties for each device that supports the device service.

* * * * *